(12) United States Patent
Sefton

(10) Patent No.: US 8,518,566 B2
(45) Date of Patent: Aug. 27, 2013

(54) MULTI-ELECTRODE MICROBIAL FUEL CELLS AND FUEL CELL SYSTEMS AND BIOREACTORS WITH DYNAMICALLY CONFIGURABLE FLUIDICS

(75) Inventor: Brian Sefton, Cupertino, CA (US)

(73) Assignee: Oakbio, Inc., Sunnyvale, CA (US)

( * ) Notice: Subject to any disclaimer, the term of this patent is extended or adjusted under 35 U.S.C. 154(b) by 586 days.

(21) Appl. No.: 12/726,980

(22) Filed: Mar. 18, 2010

(65) Prior Publication Data

US 2010/0239920 A1 Sep. 23, 2010

Related U.S. Application Data

(60) Provisional application No. 61/161,331, filed on Mar. 18, 2009.

(51) Int. Cl.
*H01M 8/16* (2006.01)
(52) U.S. Cl.
USPC .............................................. 429/2; 429/401
(58) Field of Classification Search
USPC ..................................................... 429/2, 401
See application file for complete search history.

(56) References Cited

U.S. PATENT DOCUMENTS

| | | | | |
|---|---|---|---|---|
| 5,230,803 A * | 7/1993 | Thuer et al. | ................... | 210/650 |
| 7,250,288 B2 | 7/2007 | Zeikus et al. | | |
| 2007/0099062 A1 | 5/2007 | Leonida | | |
| 2007/0259216 A1 | 11/2007 | Logan | | |
| 2007/0259217 A1 | 11/2007 | Logan | | |
| 2008/0292912 A1 * | 11/2008 | Logan et al. | ....................... | 429/2 |
| 2010/0200495 A1 * | 8/2010 | Borole et al. | .................. | 210/601 |
| 2010/0227203 A1 | 9/2010 | Ter Heijne et al. | | |

OTHER PUBLICATIONS

PCT/US10/27850 International Search Report and Written Opinion, mailed Jul. 28, 2010.
U.S. Appl. No. 12/875,708, Brian Sefton, Microbial Fuel Cell having Three or More Zones, Sep. 3, 2010.
U.S. Appl. No. 13/034,596, Brian Sefton, Methods for Control, Measurement and Enhancement of Target Molecule Production in Bioelectric Reactors, Feb. 24, 2011.
U.S. Appl. No. 13/204,649, Brian Sefton, Chemoautotrophic Bioreactor Systems and Methods of Use, Aug. 6, 2011.
U.S. Appl. No. 13/610,844, Brian Sefton, Chemoautotrophic Conversion of Carbon Oxides in Industrial Waste to Biomass and Chemical Products, Sep. 11, 2012.
U.S. Appl. No. 12/875,708 non-final Office action, mailed Dec. 4, 2012.

* cited by examiner

*Primary Examiner* — Milton I Cano
*Assistant Examiner* — Brent Thomas
(74) *Attorney, Agent, or Firm* — Peters Verny, LLP

(57) ABSTRACT

Microbial fuel cells including multiple electrodes, and systems of such fuel cells, are provided. An exemplary fuel cell includes a population of exoelectrogenic microbes and at least two anodes in an anode chamber, and a cathode in a cathode chamber. A path exists between the chambers for conducting hydrogen ions and each anode is connected to the cathode by a separate external circuit. Electrical output from the fuel cell is maximized by optimizing the microbe population, achieved by dynamically controlling the sub-populations at each of the multiple anodes. Systems comprising multiple such fuel cells connected by a dynamically reconfigurable fluidics system provide further optimization.

11 Claims, 10 Drawing Sheets

MULTI-ELECTRODE MICROBIAL FUEL CELLS AND FUEL CELL SYSTEMS AND BIOREACTORS WITH DYNAMICALLY CONFIGURABLE FLUIDICS

CROSS-REFERENCE TO RELATED APPLICATIONS

This application claims the benefit of U.S. Provisional Patent Application No. 61/161,331 filed on Mar. 18, 2009 and entitled "Control System for Microbial Fuel Cells and Bioreactors" which is incorporated herein by reference.

BACKGROUND OF THE INVENTION

1. Field of the Invention

The present invention relates generally to the field of bioelectrochemistry and more particularly to multi-electrode microbial fuel cells and dynamically reconfigurable systems comprising multiple such fuel cells.

2. Description of the Prior Art

A Microbial Fuel Cell (MFC) is a device that comprises an anode, a cathode, and a liquid medium including a population of microbes. In a microbial fuel cell the microbes perform electrochemical reactions to provide an electrical current through an external circuit disposed between the anode and the cathode. An example of a standard MFC 100 is shown in FIG. 1. The MFC 100 comprises a vessel 110 divided into an anode chamber 120 and a cathode chamber 130 by a semi-permeable membrane 140. The anode chamber 120 includes an anode 150 while the cathode chamber 130 includes a cathode 160. The anode chamber additionally includes a population of microbes 170. The anode 150 and cathode 160 are electrically connected through an external circuit 180. MFC 100 also comprises a solution 190 within which the anode 150 and cathode 160 are at least partially immersed and within which the population of microbes 170 is maintained. The semi-permeable membrane 140 is typically a proton exchange membrane (PEM), which provides a conduction path for hydrogen ions but not electrons, which then must travel over the external circuit 180 to reach the cathode 160.

In operation, a nutrient is added to the solution 190 and the microbes 170 consume the nutrient, under anaerobic conditions. The microbes 170 therefore obtain oxygen by splitting water into hydrogen ions, oxygen, and electrons. The oxygen is combined with the carbon from the nutrient to form $CO_2$, the hydrogen ions migrate across the membrane 140 to the cathode 160, and the electrons traverse the external circuit 180 from the anode 150 to the cathode 160 where the electrons combine with the hydrogen ions.

There are two general types of MFCs 100, mediated and unmediated. In a mediated MFC 100 an intermediate molecule transfers electrons from the microbes 170 to the anode 150. An example of a mediator molecule is Methyl Blue. Many types of microbes can be used in mediated MFCs, including *e. coli*.

Fewer types of microbes 170 can be used in an unmediated MFC 100. Unmediated MFCs 100 have, for at least part of their population, microbes 170 which can deposit electrons on the anode 150 directly, without the use of an added mediator. This capability is often, but not always, referred to as "exoelectrogenesis" and microbes 170 capable of exoelectrogenesis are referred to as "exoelectrogenic." Different mechanisms of exoelectrogenesis exist, and the phenomenon is observed in many species of microbes 170, most of which are bacteria. In bacteria, exoelectrogenic capability is found in specific species of diverse genera. In the case of *Shewanella* it is believed that the bacteria produce their own mediator. In the case of *Geobacter metallireducens*, it has been shown that the bacteria produce conductive pili which facilitate the deposit of electrons on the anode 150. In FIG. 1 the microbe 170 is shown touching the anode 150 to illustrate the unmediated type.

MFC 100 is sometimes referred to as a "two-chambered MFC" because, as noted, the membrane 140 separates the vessel into two chambers 120, 130. Another type of MFC are the "membraneless MFCs" which lack a physical barrier such as membrane 140. Instead, hydrogen ions travel through the solution 190 to the cathode 160 while conditions are maintained that favor the movement of electrons over the external circuit 180 to prevent the electrons from reacting with the hydrogen ions in the solution 190. MFCs of this type are generally referred to as "single chamber MFCs."

Closely related to MFCs are Microbial Electrolysis Cells (MECs) which make use of the electrons and/or hydrogen ions on the cathode-side of an MFC-like device. The nomenclature for MECs-like devices is not as well defined, so these are sometimes referred to as Biological Electrolysis Cells (BEC), Biological Electrically Assisted Microbial Reactors (BEAMR) and other names, but regardless of the name, these employ the structure of the MFC 100 except that a reaction of interest, other than the formation of $H_2O$, occurs at the cathode, with or without microbial involvement at the anode. For the purposes of this application, the term MFC is intended to cover MECs and all pseudonyms for MECs.

A flow-through MFC (FTMFC) is a MFC where a liquid or gas enters the MFC through an inlet, exits through an outlet, and is processed as it flows therebetween. Flow-through MFCs can be implemented in a number of different ways. For example, in FIG. 1 a nutrient is added to the solution 190 through an inlet to the anode chamber 120 and nutrient-depleted solution 190 is emptied from an outlet of the anode chamber 120. The solution 190 in the cathode chamber 130 can be similarly replenished. In the membraneless type of FTMFC the solution 190 flows around the anode 150 and then around the cathode 160 as it flows from the inlet of the MFC to the outlet thereof, aiding the transport of hydrogen ions to the cathode 160.

In flow-through systems, the ability and extent to which nutrients are consumed and processed by the microbes 170 is largely based on the concentration and the metabolic state of the microbes 170, which can vary with position within the MFC 100. In turn, the microbes 170 at any point grow to the concentration which can be supported by the amount of nutrient available there. In those flow-through MFCs that seek to process the nutrient concentration to below some low threshold level, the low nutrient level near the outlet will result in a low microbe population. If the nutrient concentration is below the minimum concentration required to support microbes 170, then microbe population beyond this point will be zero.

SUMMARY

The present invention provides flow-through microbial fuel cells. An exemplary flow-through microbial fuel cell comprises a first chamber, a second chamber including an inlet, an outlet, and a population of microbes such as exoelectrogenic microbes, and a path between the first and second chambers capable of conducting hydrogen ions. The exemplary flow-through microbial fuel cell further comprises a first electrode disposed within the first chamber, and second and third electrodes disposed within the second chamber and positioned such that a flow entering the through the inlet and exiting through the outlet encounters the second electrode before the third electrode. Additionally, the exemplary flow-through microbial fuel cell further comprises a first external electrical circuit connecting the second electrode to the first electrode, and a second external electrical circuit connecting the third electrode to the first electrode.

In various embodiments, the path between the first and second chambers includes a semi-permeable membrane such as a proton exchange membrane. Other embodiments of the flow-through microbial fuel cell are membraneless. In some embodiments, the first chamber also includes an inlet and an outlet so that the solution within the first chamber can also be exchanged.

The flow-through microbial fuel cell optionally comprises a controller configured to regulate the first and second external electrical circuits. Regulation of an external electrical circuit can comprise changing an electrical property of the external electrical circuit such as the resistance of the external electrical circuit. This can be achieved, for example, by changing the load on the circuit or breaking circuit, for example.

The present invention also provides treatment systems that can remove organic materials from a stream to generate electricity. An exemplary treatment system comprises a matrix of flow-through microbial fuel cells and a fluidics system. Each microbial fuel cell of the matrix includes an inlet, an outlet, and a population of microbes. The fluidics system including a first port, a second port, and a plurality of valves. The fluidics system is configured to provide fluid communication between the first port and the matrix, between the matrix and the second port, and also between the microbial fuel cells of the matrix. Additionally, the valves are reconfigurable to change a first pattern of flow through the matrix into a second pattern of flow through the matrix. In some embodiments of the treatment system the fluidics system includes an ingress manifold and an egress manifold. In these embodiments a plurality of microbial fuel cells, of the matrix of microbial fuel cells, are arranged in parallel fluid communication between the ingress and egress manifolds. Additionally, in various embodiments of the treatment system, a first population of microbes in a first microbial fuel cell of the matrix is different from a second population of microbes in a second microbial fuel cell of the matrix.

In various embodiments, the first pattern of flow includes a flow through a first microbial fuel cell of the matrix in a first direction, from an inlet to an outlet of the first microbial fuel cell. In these embodiments the second pattern of flow reverses the flow through the first microbial fuel cell, from the outlet to the inlet, so that the flow is in the direction opposite to the first direction.

In other embodiments, the first pattern of flow includes a flow from an outlet of a first microbial fuel cell of the matrix to an inlet of a second microbial fuel cell of the matrix. Here, the direction of flow in both microbial fuel cells is from inlet to outlet, and the flow passes through the first microbial fuel cell before the second microbial fuel cell. In these embodiments, the second pattern of flow includes a flow from an outlet of the second microbial fuel cell to an inlet of the first microbial fuel cell. Thus, in the second pattern of flow the direction of flow in each microbial fuel cell is still from inlet to outlet, however, the flow passes through the second microbial fuel cell before the first microbial fuel cell.

In still other embodiments, the first pattern of flow includes parallel flows through first and second microbial fuel cells of the matrix and the second pattern of flow includes serial flow from the first microbial fuel cell to the second microbial fuel cell. In still further embodiments, the first pattern of flow includes a flow through a first microbial fuel cell of the matrix and the second pattern of flow includes no flow through the first microbial fuel cell.

The present invention also provides methods for controlling a flow-through microbial fuel cell. An exemplary method comprises feeding a nutrient stream to a microbe population in a first chamber of a microbial fuel cell, detecting a change in a condition within the microbial fuel cell while feeding the nutrient stream to the microbe population, and changing a system parameter of the microbial fuel cell in response to the detected change in the condition. In these embodiments, the first chamber includes a first electrode connected by a first external electrical circuit to a counter-electrode in a second chamber of the microbial fuel cell and a second electrode connected by a second external electrical circuit to the counter-electrode. Additionally, the nutrient stream encounters the first electrode before the second electrode as the nutrient stream flows through the first chamber.

In various embodiments, the microbe population comprises exoelectrogenic microbes. In some embodiments the system parameter is an electrical property of an external electrical circuit of the separate external electrical circuits. The condition in embodiments of the method can comprise a metabolic state of the microbe population, a concentration of the nutrient, or a voltage, for example.

Another exemplary method for controlling a microbial fuel cell comprises feeding a nutrient stream to a microbe population in a first chamber of a microbial fuel cell. Here, the first chamber includes a first electrode connected by a first external electrical circuit to a counter-electrode in a second chamber of the microbial fuel cell and also includes a second electrode connected by a second external electrical circuit to the counter-electrode. Further, the nutrient stream encounters the first electrode before the second electrode as the nutrient stream flows through the first chamber. This exemplary method further comprises inhibiting further microbial growth in a sub-population of the microbial population associated with the first electrode while promoting growth of a second sub-population of the microbial population associated with the second electrode by raising a resistance of the first external electrical circuit while maintaining the second external electrical circuit. Raising the resistance of the first external electrical circuit comprises breaking the first external electrical circuit, in some embodiments. The sub-populations of microbes may be different, in various embodiments.

Methods for controlling treatment systems are also provided herein. An exemplary method comprises feeding a nutrient stream into an inlet port of a fluidics system of a treatment system, the treatment system also including a matrix of microbial fuel cells in fluid communication through the fluidic system, detecting a change in a condition within a microbial fuel cell of the matrix while feeding the nutrient stream into the inlet port, and changing a configuration of the fluidics system in response to detecting the change. In various embodiments, changing the configuration can include isolating one of the microbial fuel cells of the matrix, reversing a direction of flow through one of the microbial fuel cells of the matrix, or changing an order of flow through two of the microbial fuel cells of the matrix.

DETAILED DESCRIPTION OF THE INVENTION

Figure 1:
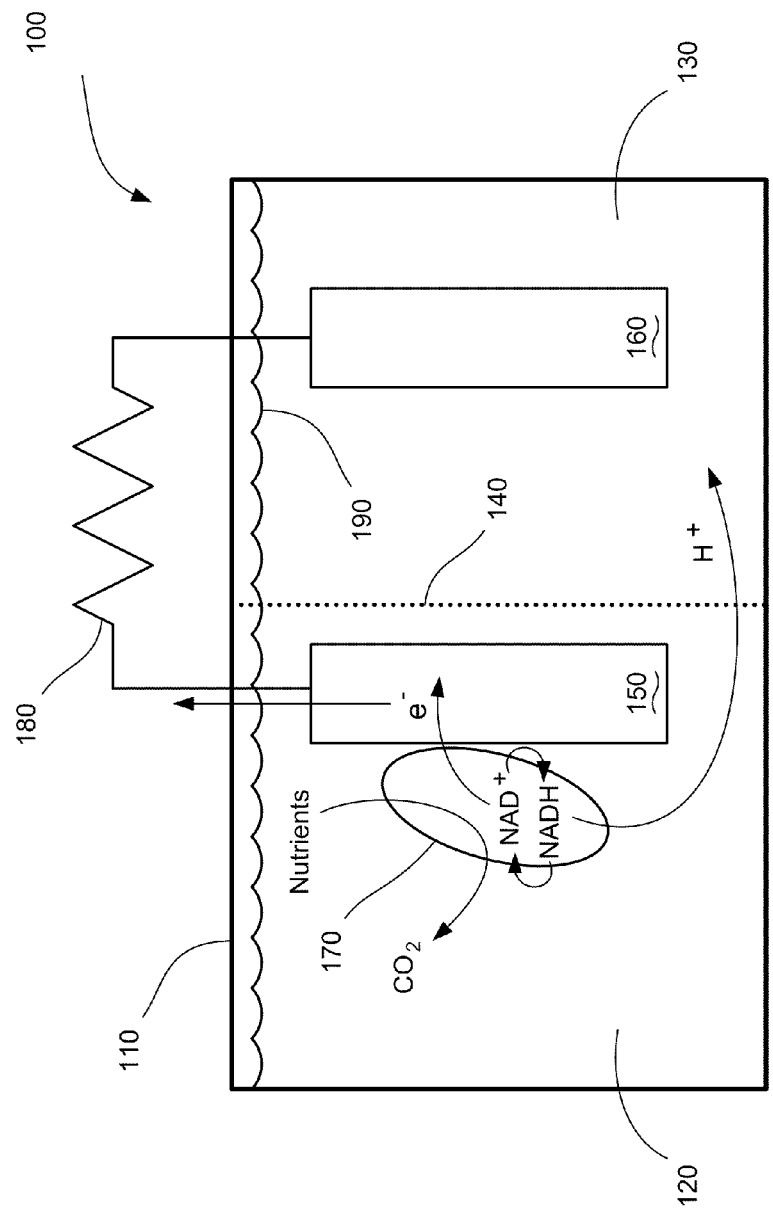
FIG. 1 is a cross-sectional view of a microbial fuel cell according to the prior art.

The present invention provides multi-electrode microbial fuel cells (MFCs), treatment systems including a plurality of such MFCs connected by a dynamically reconfigurable fluidics system, and methods for using either individual MFCs or treatment systems of multiple MFCs to process input streams that are characterized by varying nutrient levels. An exemplary MFC of the present invention includes a cathode disposed in a cathode chamber, a plurality of anodes disposed in an anode chamber, a path between the chambers capable of conducting hydrogen ions, and a separate external electrical circuit between each of the anodes and the cathode. An input stream passing through the anode chamber will encounter the anodes in succession. Other embodiments can include multiple cathodes in the cathode chamber paired with and a single anode in the anode chamber, again with a separate external electrical circuit between the anode and each of the cathodes. Still other embodiments include multiple anodes and multiple cathodes joined by multiple separate external electrical circuits.

An exemplary treatment system comprises a matrix of MFCs connected together by a fluidics system. The fluidics system includes first and second ports and is configured to direct a flow from the first port through the matrix and to the second port. The fluidics system is also dynamically reconfigurable to change the pattern of flow through the matrix of MFCs, for example, by isolating, by reversing the direction of flow through, or by changing the order of, one or more MFCs. Treatment systems of the present invention, by virtue of their modularity and fluidic connections, are adaptable to short term changes in the input stream. Long term, this same treatment system can achieve higher microbial populations, and thus higher processing capabilities, than was available in the prior art. Treatment systems of the present invention also offer ease of maintenance, scalability, and flexibility.

Methods of the invention are directed to controlling individual MFCs as well as controlling treatment systems to achieve higher and more uniform microbial populations in the MFCs than can be achieved by the prior art. In a multi-electrode MFC, for example, conditions within the MFC are monitored and system parameters are modified in response thereto. For example, the growth of sub-populations of microbes, each sub-population being associated with one of the several electrodes, can be individually monitored and controlled. Breaking the external electrical circuit to an upstream electrode will inhibit growth of the sub-population around that electrode, allowing more nutrients to reach downstream electrodes, thus fostering increased growth in those sub-populations.

Higher and more uniform microbial populations can also be achieved in systems of multiple MFCs by changing the direction of flow through one or more of the MFCs, and/or by varying the order of the MFCs in the flow path. Reversing the direction of flow in a MFC can achieve the same goal of providing greater nutrient levels to sub-populations that previously were receiving only nutrient-depleted solution. Likewise, changing the order of the MFCs can achieve the same effect.

Figure 2:
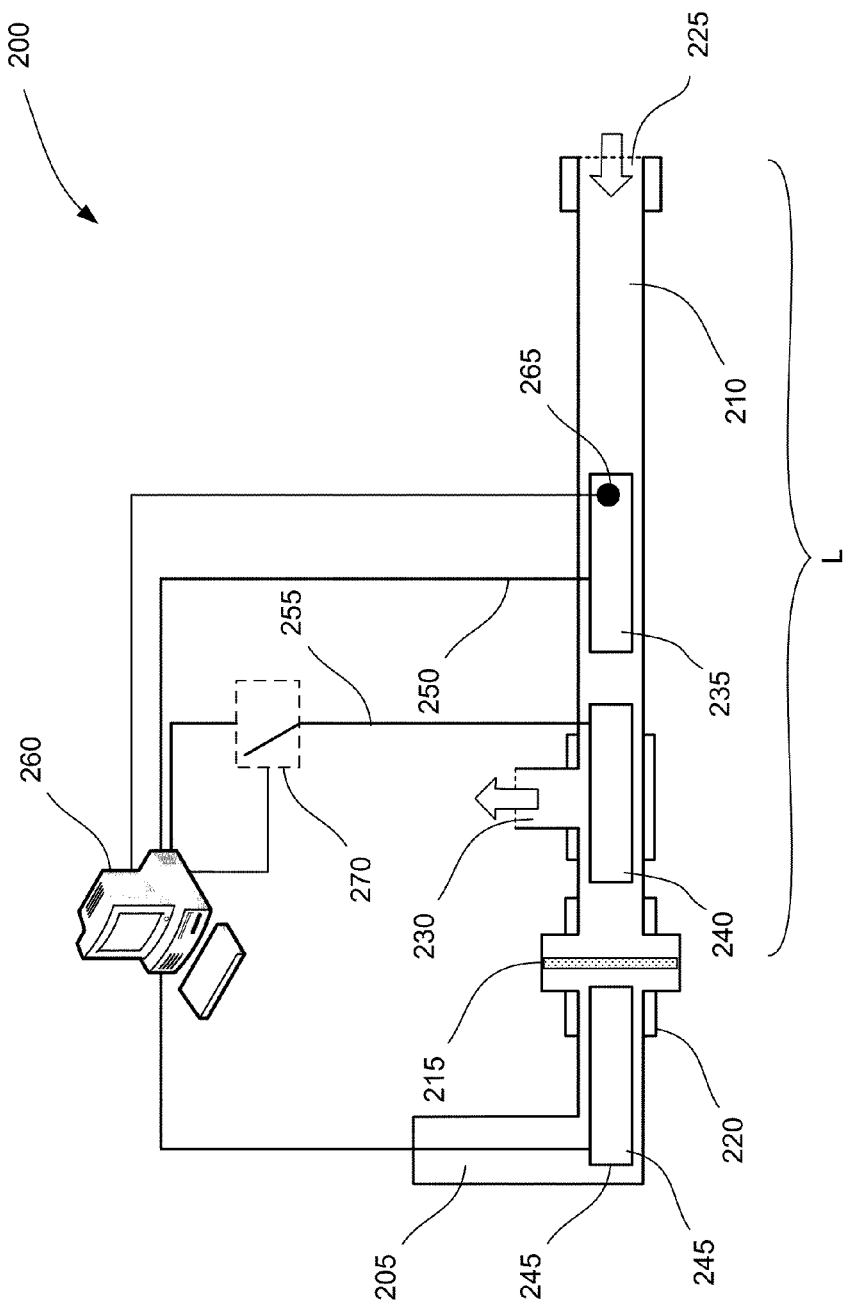
FIG. 2 is a cross-sectional view of a flow-through microbial fuel cell according to an exemplary embodiment of the present invention.

FIG. 2 shows a schematic representation of an exemplary multi-electrode flow-through MFC 200 including a cathode chamber 205 and an anode chamber 210. The chambers 205 and 210 are separated by a semi-permeable membrane 215. In some embodiments, the MFC 200 consists of a continuous vessel 220 and the membrane 215 separates the vessel 220 into the two chambers 205 and 210, while in other embodiments the chambers 205, 210 are separable units. In various embodiments the membrane 215 is disposed within a replaceable cartridge or otherwise configured to be readily exchanged. The membrane 215 can be a proton exchange membrane, a dialysis membrane, or a size-exclusion membrane, in various embodiments. Some embodiments of the MFC 200 are membraneless; these embodiments are structurally the same as shown in FIG. 2, but without the membrane 215.

The anode chamber 210 is configured for flow-through operation and accordingly includes an inlet 225 and an outlet 230. In various embodiments, such as the one illustrated with respect to FIG. 2, the anode chamber 210 comprises a cylindrical configuration. In these embodiments a cross-section taken perpendicular to the longitudinal axis of the cylinder can be circular or non-circular, such as square or hexagonal. As used herein, a cylindrical configuration is defined as a cylinder having a length along the symmetry axis greater than the diameter of the perpendicular cross-section such that the anode chamber 210 comprises a tube or similar conduit.

In other embodiments the anode chamber 210 can comprise designs that depart from the straight conduit. For example, the anode chamber 210 can comprise a tank with the inlet 225 at the bottom and the outlet 230 at the top. As another example, the anode chamber 210 can comprise a circular tank with the outlet 230 at the center and one or more inlets 225 disposed along the sidewall. Thus, it should be apparent that there can be more than one inlet 225 and/or more than one outlet 230 in various embodiments of the anode chamber 210.

In those embodiments in which the anode chamber 210 comprises a conduit, such as a tube, the inlet 225 is disposed proximate to a first end of the anode chamber 210 and the outlet 230 is disposed proximate to an opposite second end of the anode chamber 210. In some of these embodiments, the inlet 225 is at the first end of the anode chamber 210, as illustrated in FIG. 2. The anode chamber 210, in these embodiments, is characterized by a length, L, and a cross-sectional area measured perpendicular to the length that may vary as a function of the length or may be essentially constant over the length.

The anode chamber 210 includes a first anode 235 and second anode 240 that are disposed within the anode chamber 210 such that a flow entering the inlet 225 and exiting the outlet 230 would encounter the first anode 235 before encountering the second anode 240. In the illustrated system of FIG. 2, the first and second anodes 235, 240 are disposed within the anode chamber 210 at different locations relative to the length such that the first anode 235 is proximate to the inlet 225 and the second anode 240 is proximate to the outlet 230. In embodiments where the anode chamber 210 comprises another form, such as a tank, the anodes 235, 240 can be located near the top and bottom of the tank, or near the perimeter and center of the tank, for example. While only two anodes 235, 240 are provided in FIG. 2, embodiments of the invention are not limited to only two anodes and can comprise three or more anodes.

In operation, the anode chamber 210 includes a microbe population (not shown) that can include exoelectrogenic microbes, for example. The microbe population can comprise a consortium of several different strains, in various embodiments. The concentration and metabolic state of a microbe population can vary as a function of position within the anode chamber 210. For example, the concentration and metabolic state of a microbe in the vicinity of the first anode 235 can be different than in the vicinity of the second anode 240. In some instances, the microbe population varies as a function of position in that different strains are maintained in the vicinities of different anodes. The anode chamber 210 can also include, in some embodiments, one or more mediators (not shown) in those instances where the microbes are not exoelectrogenic. As with the microbes, mediator concentrations may vary as a function of position within the anode chamber 210. Semi-permeable or dialysis membranes (not shown) can be disposed within the anode chamber 210 between anodes 235, 240 to maintain different microbe populations in the vicinity of each anode 235, 240.

Turning to the cathode chamber 205, a cathode 245 is disposed therein to serve as a counter-electrode to the anodes 235, 240. In some embodiments the cathode chamber 205 is also a flow-through chamber like anode chamber 210, while in other embodiments the cathode chamber 205 is sealed, as illustrated by FIG. 2. In some embodiments in which the cathode chamber 205 is also a flow-through chamber, more than one cathode 245 can be included such that a flow through the cathode chamber 205 encounters the cathodes in succession. More than one cathode 245 can also be employed where the cathode chamber 205 is sealed.

It will be understood that the terms "anode" and "cathode," as used herein to describe electrodes and the chambers in which they reside, are given for ease of understanding the invention but are not limiting. In other words, the same system illustrated in FIG. 2 could be operated such that the flow-through chamber with the multiple electrodes is the cathode chamber and the electrodes therein are cathodes, while the sealed chamber is the anode chamber with a single anode therein, for example.

A first external electrical circuit 250 connects the first anode 235 to the cathode 245 while a separate second electrical circuit 255 connects the second anode 240 to the cathode 245. Each of the external electrical circuits 250, 255 also includes a load (not shown) to make use of the power generated by the MFC 200. The loads add resistances to the external electrical circuits 250, 255 and can comprise one or more storage batteries, for example. In some instances the loads can be independently varied to increase or decrease the resistances of the respective external electrical circuits 250, 255.

The MFC 200 also comprises a controller 260 that includes logic for monitoring and controlling the MFC 200. The controller 260, in various embodiments, can comprise hardware, such as application-specific integrated circuits (ASICs), that are specifically designed to perform the particular monitoring and control functions. The controller 260, in various embodiments, can also comprise firmware residing, for instance, in read only memory (ROM) or flash memory, where the firmware is programmed to perform the particular monitoring and control functions. The controller 260, in various embodiments, can also comprise a processor and a memory, such as a random access memory (RAM), where the processor is capable of executing software instructions residing in the memory for performing the particular monitoring and control functions. The controller 260 can also comprise any combination of two or more of hardware, firmware, and a processor executing software. Monitoring and control functions are described elsewhere herein, and in particular with reference to FIG. 3.

In some embodiments, the cathode and/or anode chambers 205, 210 also include one or more sensors 265 connected to the controller 260 to provide to the controller 260 signals that are indicative of conditions within the MFC 200. For ease of illustration, only one sensor 265 is shown in FIG. 2, in association with the first anode 235, but in some embodiments a sensor 265 is associated with each anode 235, 240 and in some embodiments in association with each electrode in the MFC 200. In other embodiments, sensors 265 can be disposed in other locations within the MFC 200 to monitor conditions that are not dependent upon the anodes 235, 240 themselves. Monitored conditions can include temperature, pressure, pH, flow rate, the concentration and metabolic state of the microbes, nutrient levels, total organic carbon, gas consumption and evolution, electrical parameters such as resistance, the concentration of one or more chemicals, and so forth. In some instances sensors 265 are physically attached to electrodes, while in other embodiments such sensors 265 are situated in close proximity to the electrodes. Electrodes themselves can also function as sensors 265, in some embodiments. In some instances, the voltage between anode 235 or 240 and cathode 245 constitutes a monitored condition.

In various embodiments, one or more of the external circuits 250, 255 include a switch 270, such as a relay switch. The switch 270 is controlled by the controller 260 to open and close the external circuit. Opening the external circuit prevents the flow of electricity between the associated anode 235 or 240 and the cathode 245, inhibiting the further growth of microbes in the sub-population associated with the anode 235 or 240. Growth can also be inhibited, to a lesser degree, by increasing the load on the external circuit, such as through the use of a variable resistor (not shown).

Figure 3:
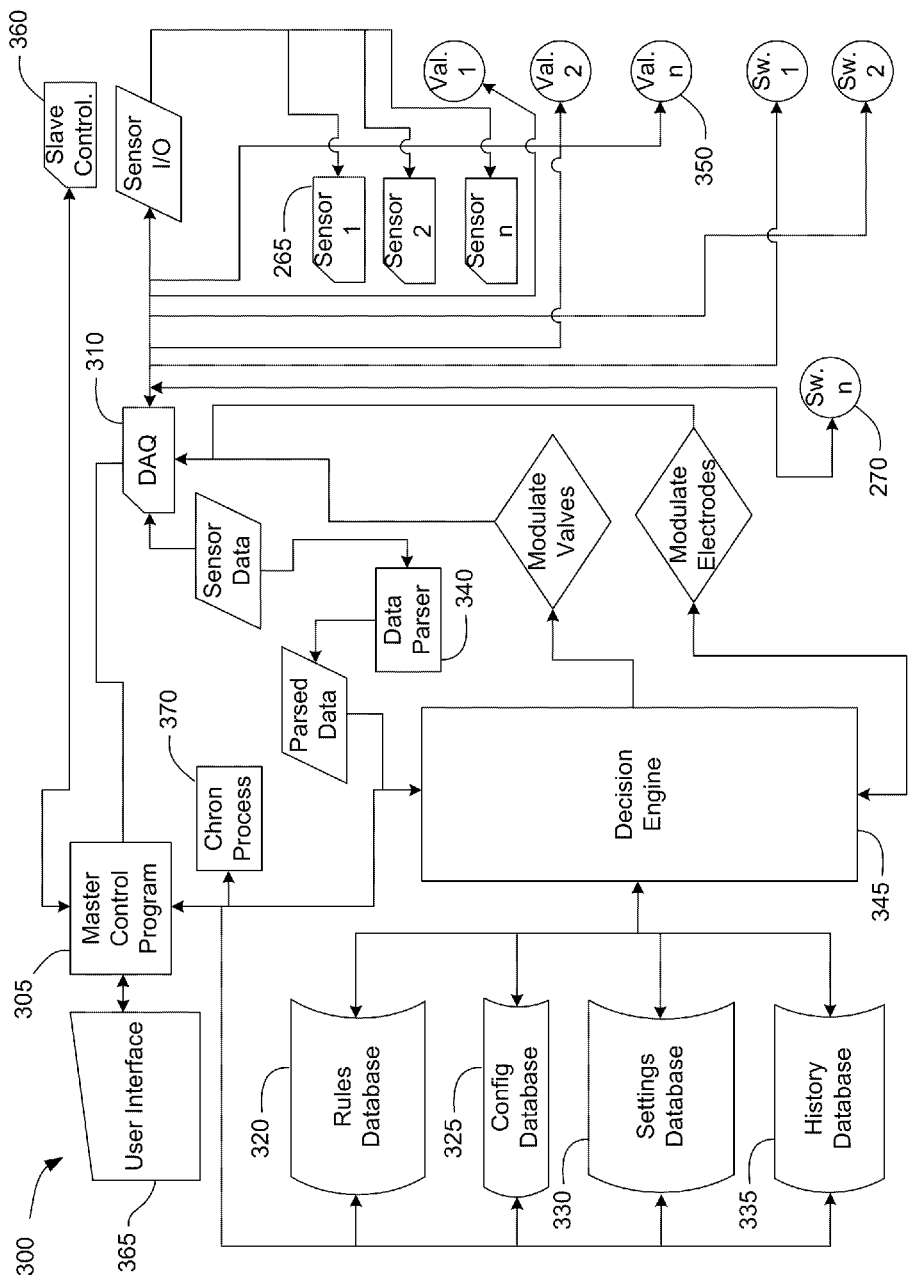
FIG. 3 is a schematic representation of a control system according to an exemplary embodiment of the present invention.

FIG. 3 is a schematic representation of an exemplary control system 300. Logical components of the system 300 can be implemented by the controller 260 and include a master control program 305, which may run continuously as a daemon, in some embodiments. The master control program 305 controls DAQs 310 (only one shown for simplicity), polls sensors 265 and distributes data among the subsystems discussed below. Sensors 265 can comprise conventional sensors such as pH and temperature sensors, as well as sensors powered by the deposition of electrons from microbes. In some embodiments, one or more electrodes serve as sensors 265.

DAQs 310 comprise sensor and control interface boards, or units, which provide data communication interfaces between the controller 260 and the sensors 265 and other controllable elements of the system 300. In some instances, a DAQ 310 comprises an analog to digital data converter. In various embodiments, DAQs 310 provide wireless communication interfaces to any or all of the sensors 265 and any controllable elements.

The system 300 also comprises a number of databases, for example, a rules database 320, a configuration database 325, a settings database 330, and a history database 335. The rules database 320 contains rules which are alphanumeric or binary representations of actions based on input data from the sensors 265 or other sources. Rules can take the form of 'if then' statements where 'if' represents a condition and 'then' an action. Rules can also comprise sets of criteria covering Boolean operations in relation to the nature of the input, or algorithms which in some embodiments are at least partially derived from historical data, i.e., learning algorithms or other statistical methods. The rules can comprise, in various embodiments, Bayesian or other types of rule sets.

The configuration database 325 contains the current system configuration. The current system configuration can include information such as which strains of microbes are in the MFC 200, which switches 270 are open and closed, and the like. As discussed in greater detail below with respect to FIGS. 4-10, the present disclosure is also directed to treatment systems that comprise a matrix of MFCs 200 connected by a fluidics system, and in these systems the controller 260 can be further employed to control each of the MFCs 200 of the matrix as well to control the fluidics system. In these embodiments, the configuration database 325 contains the current system configuration for each MFC 200 as well as the current system configuration for the fluidics system, such as valve settings and so forth.

The settings database 330 includes information that defines the set of possible system configurations and is accessed when the implementation of a rule requires a change in the current system configuration. In some embodiments the settings database 330 includes pre-determined system configurations to achieve specific objectives (e.g., specific flow and or electrical conditions). In these embodiments, for example, the implementation of a rule may specify a particular configuration which can then be read from the settings database 330. In other embodiments, the settings database 330 includes operational constraints for the controllable system components to prevent undesirable outcomes such as overly high pressure. Operational constraints can include operational ranges and limits for individual components as well as constraints on components in combination, for example, when one valve is open, another must be closed.

The history database 335 comprises historical data. Historical data can comprise prior settings, sensors readings, control operations, configurations, alterations to the system and user input data. The history database 335 can be accessed for troubleshooting and for system optimization functions, for example.

The system 300 also comprises a data parser 340. The data parser 340 receives sensor data from the DAQs 310 and converts the sensor data into an appropriate format for later use. Parsed data from the data parser 340 may be stored in the history database 335, and may be used, for example, by the master control program 305 and a decision engine 345.

The decision engine 345 communicates with the master control program 305, the data parser 340, the databases 320-335, and DAQs 310. The decision engine 345 responds to commands from the master control program 305 and parsed sensor data from the data parser 340 to control individual MFCs 200, and in treatment systems to also control the fluidics system. The decision engine 345 accesses the databases 320-335 for rules, operational constraints, historical data and the like, to control the fluidic system by modulating valves 350, for example, and to control MFCs 200 by setting switches 270, adjusting electrical loads, pump rates, fluidic levels, pressures, flow rates, and so forth. Control signals from the decision engine 345 are sent to the DAQs 310 and from there to the valves 350, switches 270, and so forth.

The system 300 optionally comprises one or more slave controllers 360. A slave controller 360 is a remote or separate module which performs at least some of the same functions as the master control program 305. In some embodiments, the slave controller 360 comprises a special purpose 'embedded system' running a real time operating system, or reduced operating system. It will be appreciated that each slave controller 360 is connected to further sensors and valves, etc., (not shown) for those portions of the overall system over which the slave controller 360 exercises control. Slave controllers 360 allow control to be distributed, as the slave controllers 360 can act autonomously or semi-autonomously in various embodiments.

The system 300 also comprises a user interface 365. The user interface 365 provides a display for an operator to monitor the MFCs 200 and the fluidics system and one or more input mechanisms (touch screen, mouse, keyboard, etc.) to configure and operate the same. The system 300 optionally comprises a chron process 370, which comprises a time-based event management system, that can be programmed via the user interface 365 or the master control program 305, to perform certain tasks on a predetermined schedule.

Figure 4:
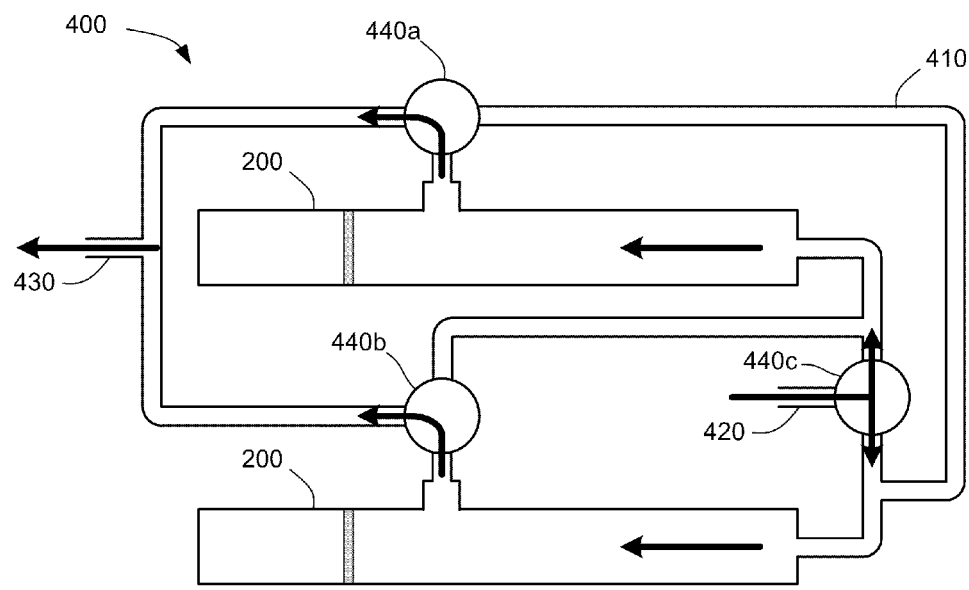
FIGS. 4-7 show a schematic representation of a treatment system comprising a matrix of two microbial fuel cells connected by a fluidics system, according to an exemplary embodiment of the present invention, where the fluidics system is configured for different flow patterns in each of the four drawings.

FIG. 4 is a schematic representation of a treatment system 400 comprising a matrix of two MFCs 200 and a fluidics system 410. In this, and the following illustrated embodiments, semi-permeable or dialysis membranes (not shown) can be disposed within the several MFCs 200, such as within inlets 225 and outlets 230, and/or within the fluidics system 410 to prevent the movement of microbes from one MFC 200 to another, or from entering or exiting the treatment system 400. The fluidics system 410 comprises an inlet port 420, an outlet port 430, though it will be appreciated that the terms "inlet" and "outlet" are arbitrary in as much as the flow through the treatment system 400 is reversible. The fluidics system 410 provides fluid communication between the inlet port 420 and the matrix of MFCs 200, between the matrix of MFCs 200 and the outlet port 430, as well as between the MFCs 200 of the matrix. The fluidics system 410 also comprises a plurality of valves 440 configured to regulate flows throughout the treatment system 400. In various embodiments, the valves 440 are configured such that flow can be directed between any two of three lines that join at the valve 440. Valves 440 are also configured to block all or partial flow between the lines.

FIG. 4 shows the treatment system 400 configured for parallel flow through the two MFCs 200. In parallel operation, the flow entering the inlet port 420 is split in two by valve 440c, sending streams into both MFCs 200. The streams through both MFCs 200 traverse each from the inlet 225 to the outlet 230. Valves 440a and 440b direct each stream to the outlet port 430 where the streams are recombined and exit the fluidics system 410 and the treatment system 400.

Figure 5:
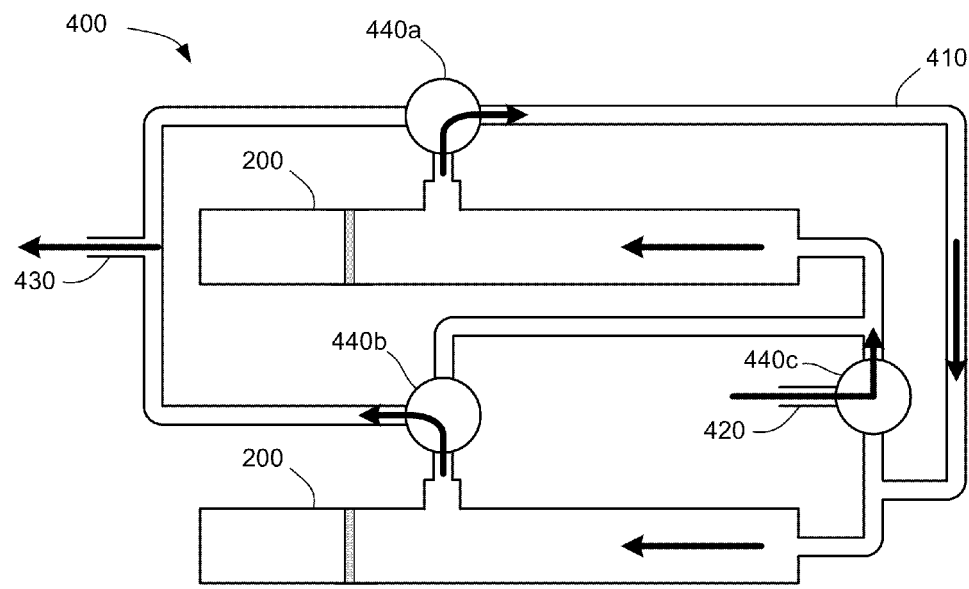
Figure 6:
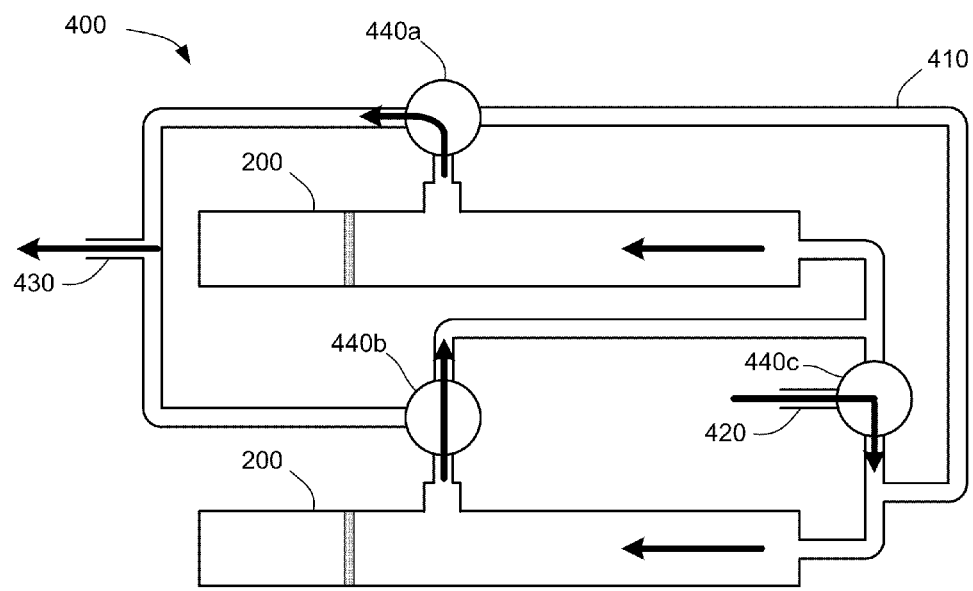
Figure 7:
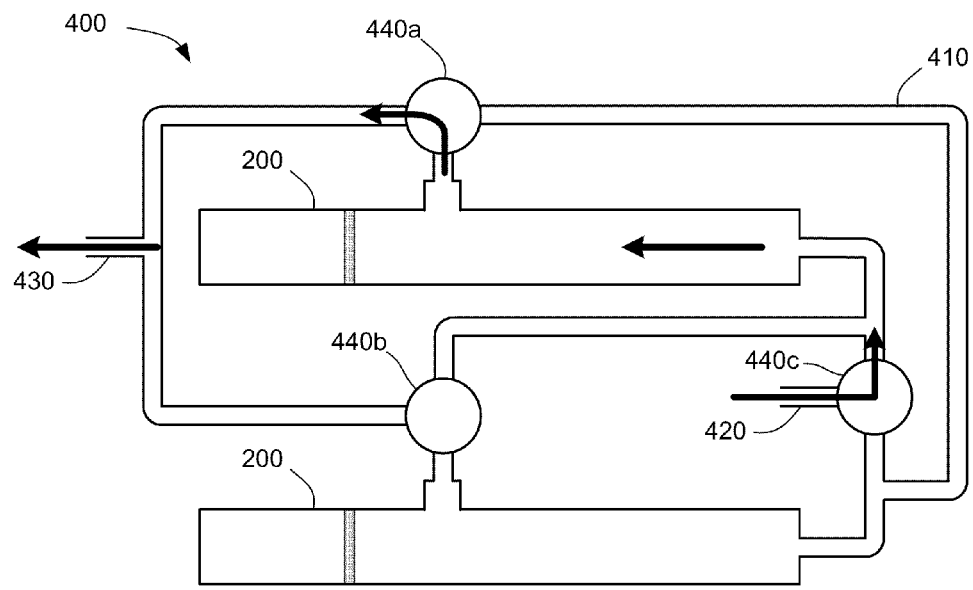

FIGS. 5-7 show the same treatment system 400 in three additional configurations. FIGS. 5 and 6 show the treatment system 400 configured for serial operation while FIG. 7 shows one MFC 200 taken off-line. In FIG. 5, the valve 440c at the inlet port 420 directs the flow to one MFC 200, the valve 440a at the outlet 230 of that MFC 200 directs the flow to the inlet 225 of the other MFC 200, and valve 440b at the outlet 230 of the second MFC 200 directs the flow to the outlet port 430. Thus, in FIG. 5 the flow passes through one MFC 200 and then the next. FIG. 6 also illustrates serial flow through the two MFCs 200. In FIG. 6 the streams flow through the MFCs 200 in the same direction as in FIG. 5, but in the opposite order relative to FIG. 5.

Serial flow, as in FIGS. 5 and 6, enables the processing of flows that include higher organic/chemical concentrations, compared to the processing capacity provided by parallel flow. Serial flow also favors the growth of microbes in the first MFC 200 to receive the flow, while the second MFC 200 will still receive sufficient nutrients to maintain a microbe population. Thus, in serial flow, the electrical output of the first MFC 200 will exceed the electrical output of the second MFC 200 in the series. Periodically reversing the order of the MFCs 200 allows the microbe populations in both to be maximized.

FIG. 7 shows the treatment system 400 with one MFC 200 taken off-line. In this configuration, the fluidics system 410 directs the flow from the inlet port 420 through only one MFC 200 and from that MFC 200 to the outlet port 430. The MFC 200 that is off-line can be maintained, re-innoculated, the microbes can be re-grown, replaced, stimulated with $O_2$ or provided with a high nutrient level medium, or the entire consortium can be changed for another. It will be understood that additional ports for adding $O_2$ or removing $CO_2$ and/or additional valves for introducing the high nutrient level medium may be included in MFCs 200, though not shown in the present drawings for simplicity.

In FIGS. 4-7 it should be noted that the microbial populations within each MFC 200 can be different. Thus, for example, each MFC 200 can include the same microbe strain but in different metabolic states, or can include the same microbe strain in the same metabolic state but in different concentrations, or can include different strains or different consortia of microbes.

Figure 8:
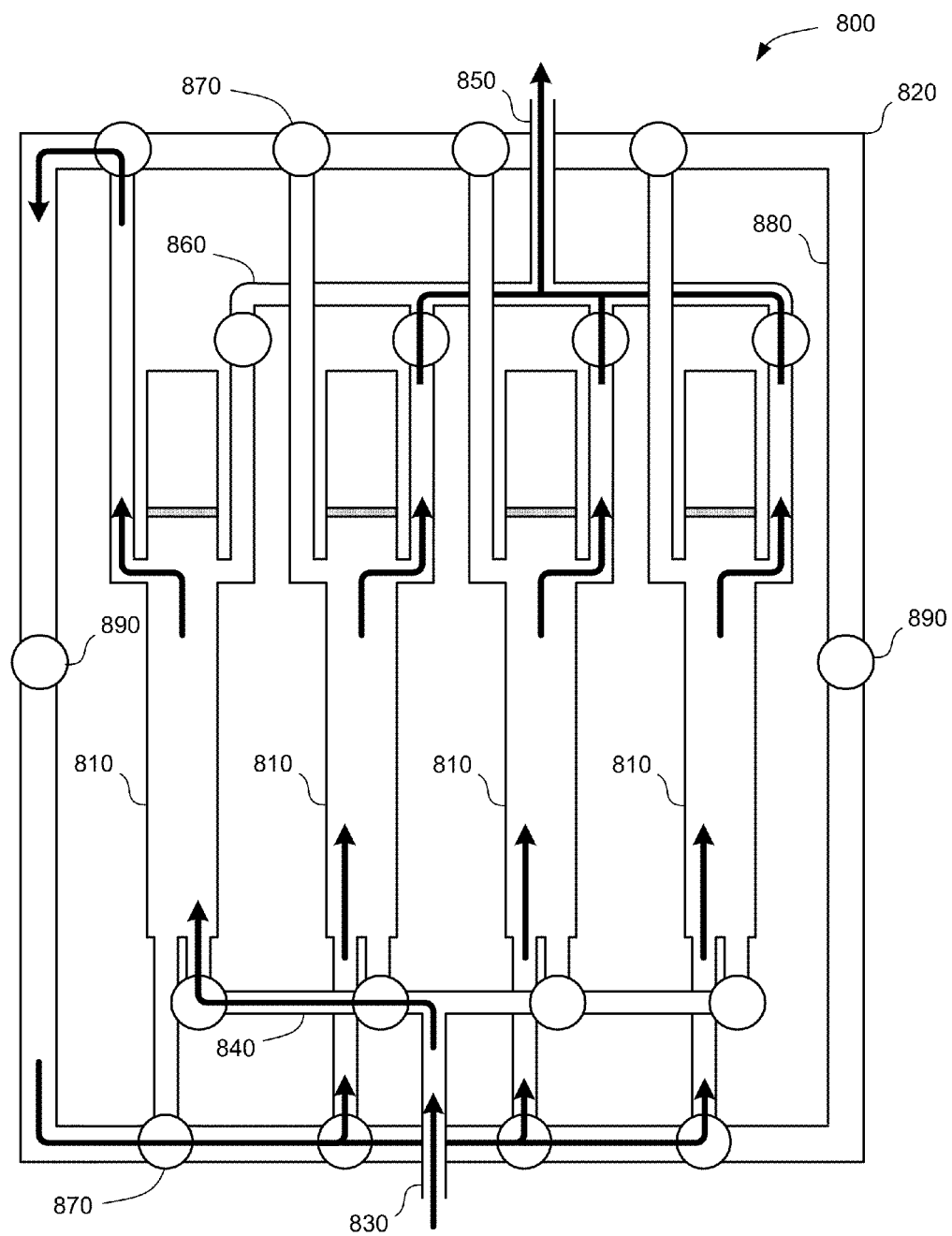
FIG. 8 is a schematic representation of a treatment system comprising a matrix of four microbial fuel cells and a fluidics system according to another exemplary embodiment of the present invention.

FIG. 8 is a schematic representation of a treatment system 800 comprising a matrix of four MFCs 810 and a fluidics system 820. The MFCs 810 differ from the MFCs 200 only in that each of the MFCs 810 has two inlets and two outlets, as shown. As above, the environments within each MFC 810 can be different. Thus, for example, each MFC 810 can include the same microbe strain but in different metabolic states, or can include the same microbe strain in the same metabolic state but in different concentrations, or can include different strains or different consortia of microbes.

The fluidics system 820 comprises an inlet port 830 in fluid communication with an ingress manifold 840 and an outlet port 850 in fluid communication with an egress manifold 860. As illustrated, one inlet of each MFC 810 is in fluid communication with the ingress manifold 840 and one outlet of each MFC 810 is in fluid communication with the egress manifold 860.

The fluidics system 820 also comprises a plurality of valves 870 that couple the second inlet and second outlet of each MFC 810 to a loop 880 of the fluidics system 820. Two shut-off valves 890 are disposed at opposite ends of the loop 880, as shown, to control the direction of flow around the loop 880. Each MFC 810 has an associated pairs of valves 870, one on an inlet and one on an outlet, that are configured to work in tandem such that when one is closed the other is open. In the illustrated example of FIG. 8, the left-most MFC 810 in the drawing is set such that the valve 870 on the outlet is open, while the valve 870 on the inlet is closed (but allows flow to continue along the loop 880 as indicated). The other valves 870 of the other three MFCs 810 are set oppositely. In this example, the flow from the ingress manifold 840 is only provided to the left-most MFC 810. Reversing the settings of the pairs of valves 870 associated with the other MFCs 810 will allow flow from the ingress manifold 840 into these MFCs 810 as well. Accordingly, the flow from the ingress manifold 840 can be directed into any combination of the four MFCs 810.

Returning to the example illustrated by FIG. 8, the flow that passes through the left-most MFC 810 enters the loop 880 and returns to the ingress side of the treatment system 800 where it is split into three parallel flows, one for each of the remaining three MFCs 810. Here, the flows traverse the other three MFCs 810 in the same direction as the flow through the left-most MFC 810. These three flows then are recombined in the egress manifold 850 and exit the treatment system 860 through the outlet port 850.

It should be readily apparent that various other flow patterns are possible with the treatment system 800. For example, by appropriately setting the valves 870, 890 the flow from the ingress manifold 840 can be directed through one MFC 810 into the loop 880, and from the loop 880 back through one or two other MFCs 810 in the opposite direction, and then through the remaining MFC(s) 810 in the original direction to the egress manifold 860.

Figure 9:
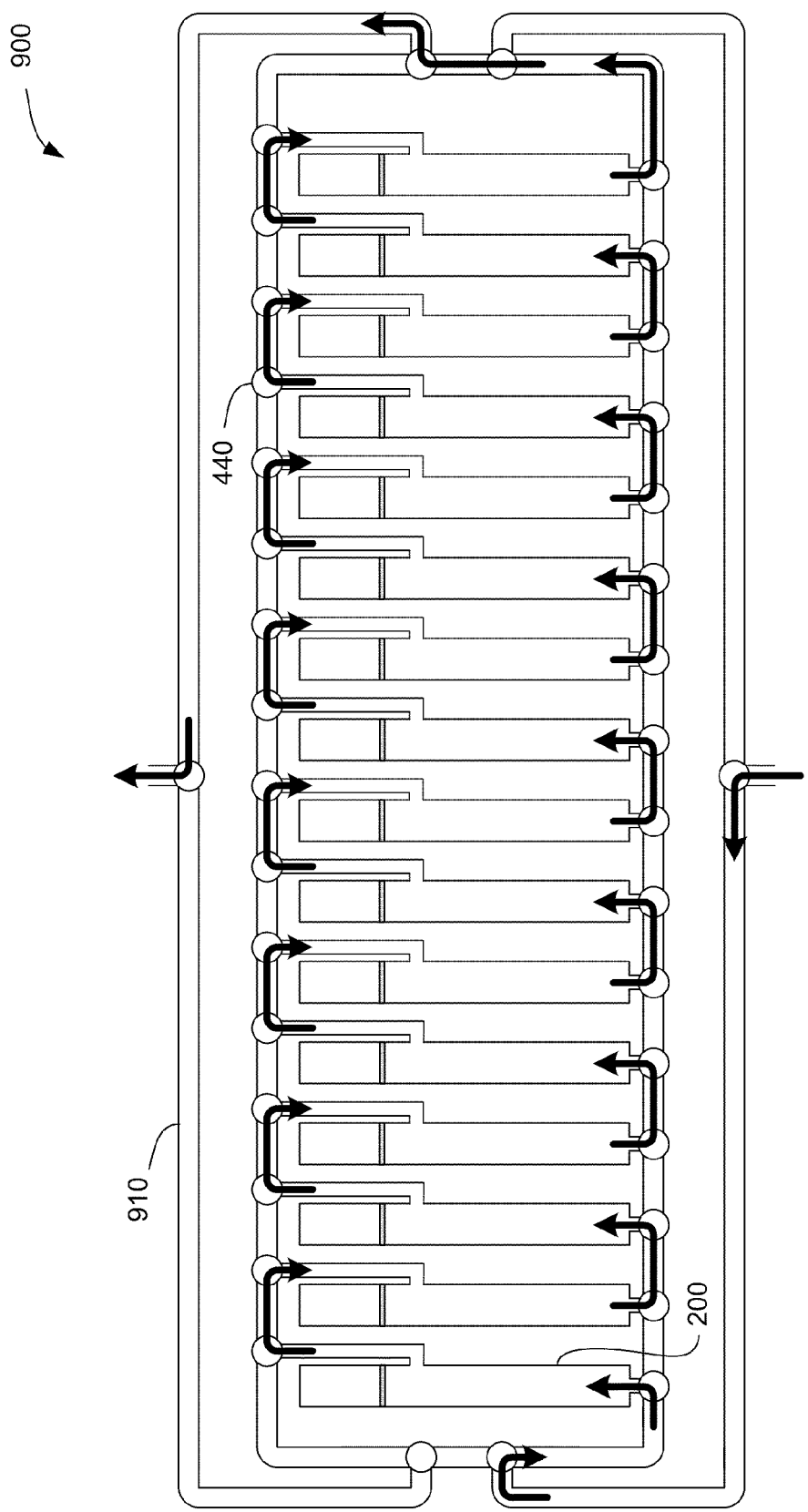
FIGS. 9 and 10 show a schematic representation of a treatment system comprising a matrix of 16 microbial fuel cells connected by a fluidics system, according to another exemplary embodiment of the present invention, where the fluidics system is configured for different flow patterns in each drawing.
Figure 10:
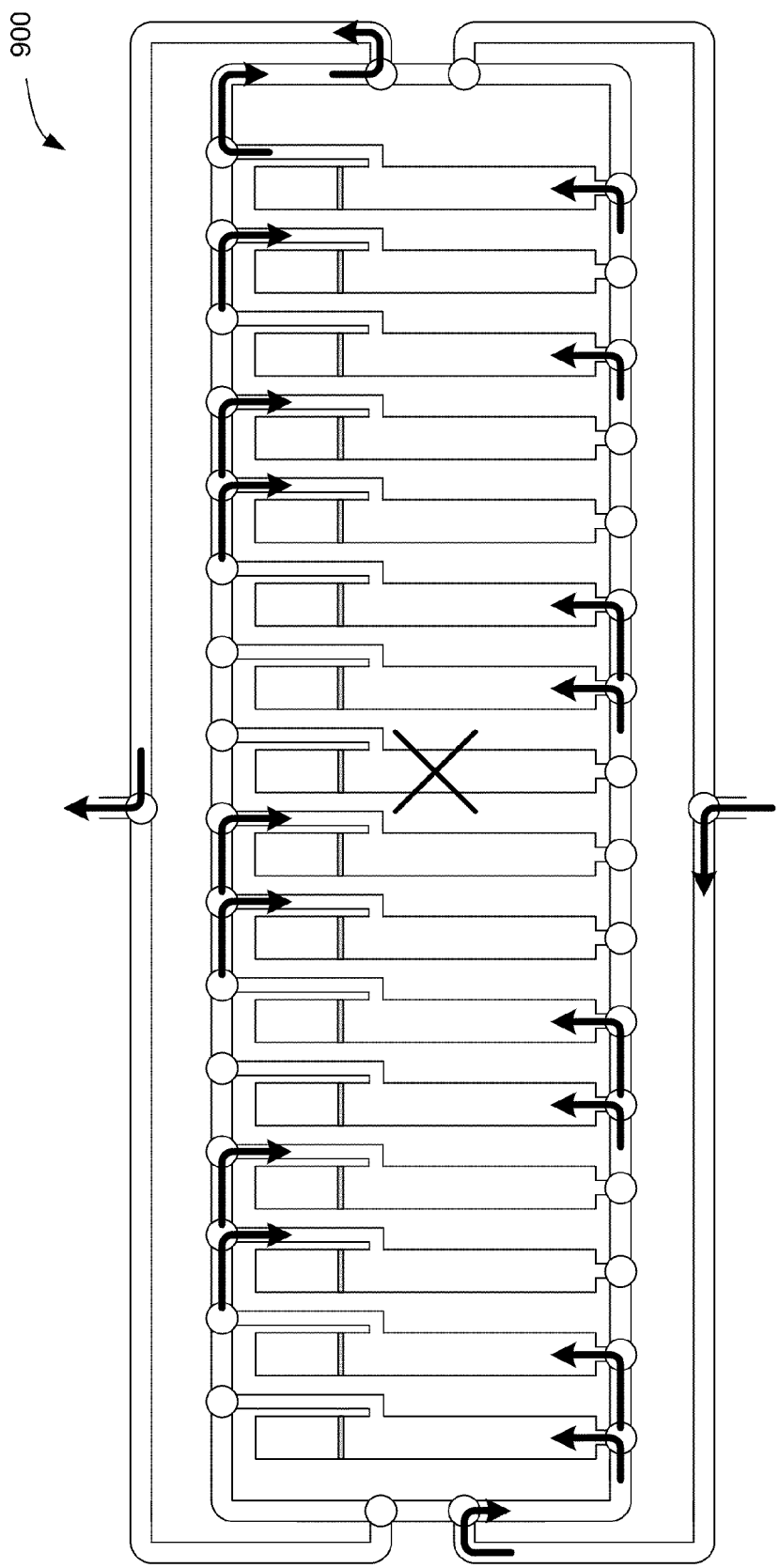

FIGS. 9 and 10 show a schematic representation of a treatment system 900 comprising a matrix of 16 MFCs 200 and a fluidics system 910. It should be noted that the microbial populations within each MFC 200 of the treatment system 900 can be different. Thus, for example, each MFC 200 can include the same microbe strain but in different metabolic states, or can include the same microbe strain in the same metabolic state but in different concentrations, or can include different strains or different consortia of microbes.

In FIG. 9 the valves 440 are configured such that flow from the inlet port traverses the matrix of MFCs 200 in a serial flow. It can be seen that the valves 440 can also be configured to provide parallel flow through each MFC 200, as well as many configurations in which the flow progresses serially through sets of MFCs 200, and where the flows through each set are in parallel. One alternative configuration is shown in FIG. 10. In this configuration, one MFC 200 (marked with an "X") is off-line.

Figure 11:
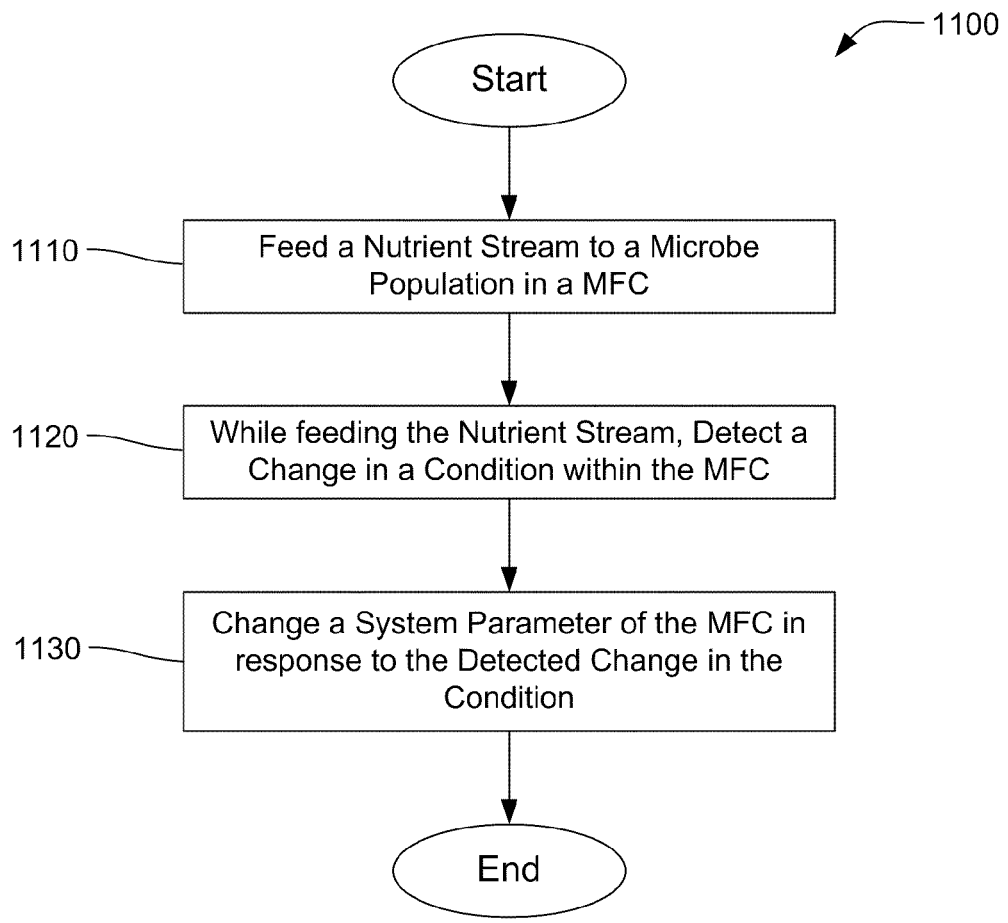
FIG. 11 is a flow-chart representation of a method of controlling a microbial fuel cell according to an embodiment of the present invention.

FIG. 11 is a flow-chart representation of an exemplary method 1100 of controlling a MFC, where the MFC comprises a first chamber including a first electrode and a second electrode, each electrode connected by a separate external electrical circuit to a counter-electrode in a second chamber of the MFC. The method 1100 comprises a step 1110 of feeding a nutrient stream to a microbe population in the first chamber, a step 1120 of detecting a change in a condition within the MFC while feeding the nutrient stream to the microbe population, and a step 1130 of changing a system parameter of the microbial fuel cell in response to the detected change in the condition.

The step 1110 comprises feeding the nutrient stream to the microbe population in the first chamber of the MFC. The microbe population comprises exoelectrogenic microbes, in some embodiments. In other embodiments, the microbe population comprises non-exoelectrogenic microbes, and in these embodiments, the method 1100 may further comprise an optional step of adding a mediator to the first chamber. The mediator may be added before feeding the nutrient stream to the microbe population, while feeding the nutrient stream to the microbe population, or both.

In step 1110, as the nutrient stream flows through the first chamber, the nutrient stream encounters the first electrode before encountering the second electrode. Thus, as the nutrient stream flows through the first chamber, the nutrients therein are consumed first by a sub-population of the microbe population that is associated with the first electrode. The nutrient stream that reaches the second electrode is at least partially depleted. Examples of suitable nutrient streams include waste water from industrial and municipal sources.

Step 1120 comprises detecting a change in a condition within the MFC while feeding the nutrient stream to the microbe population. Examples of conditions, the change of which may be detected in step 1120, include temperature, pressure, pH, flow rate, the metabolic state of the microbe population, the concentration of microbes, the concentration of the nutrient, concentrations of waste products such as $CO_2$, voltages measured between the electrodes in the first chamber and the counter-electrode, and so forth. Conditions can be monitored by receiving data from one or more sensors disposed within the MFC. In some instances, the electrodes in the first and second chambers themselves can additionally serve as sensors.

Step 1130 comprises changing a system parameter of the microbial fuel cell in response to the detected change in the condition. An exemplary system parameter is an electrical property of an external electrical circuit such as the electrical resistance, or load, of the external electrical circuit. In one example, the resistance can be made infinite by activating a switch to break the external electrical circuit. Step 1130 is achieved, in some embodiments, by applying a rule. As an example, a rule can comprise breaking an external electrical circuit if the measured temperature exceeds a threshold. In step 1120 the changing temperature is detected, and, if the temperature change causes the measured temperature to exceed the threshold, then application of the rule causes the system parameter, the resistance of the external electrical circuit, to be changed by breaking the external electrical circuit. Another example of the method 1100 includes detecting a change in the pressure within the first chamber in step 1120 and opening a relief valve in step 1130.

In some embodiments, step 1130 is performed to inhibit further microbial growth in one sub-population of the microbial population while promoting growth of a second sub-population of the microbial population. As just described, this can be accomplished by raising the electrical resistance of one external electrical circuit while maintaining the electrical resistance of another external electrical circuit. Here, electrical resistance is maintained by keeping the electrical resistance unchanged in a range where meaningful current can flow through the external electrical circuit. In various embodiments the first and second sub-populations are different, for example, the microbes can be the same but in different metabolic states or concentrations, the microbes in the two sub-populations can be different microbes, or each sub-population can comprise a different balance of the several microbes in a consortium.

Figure 12:
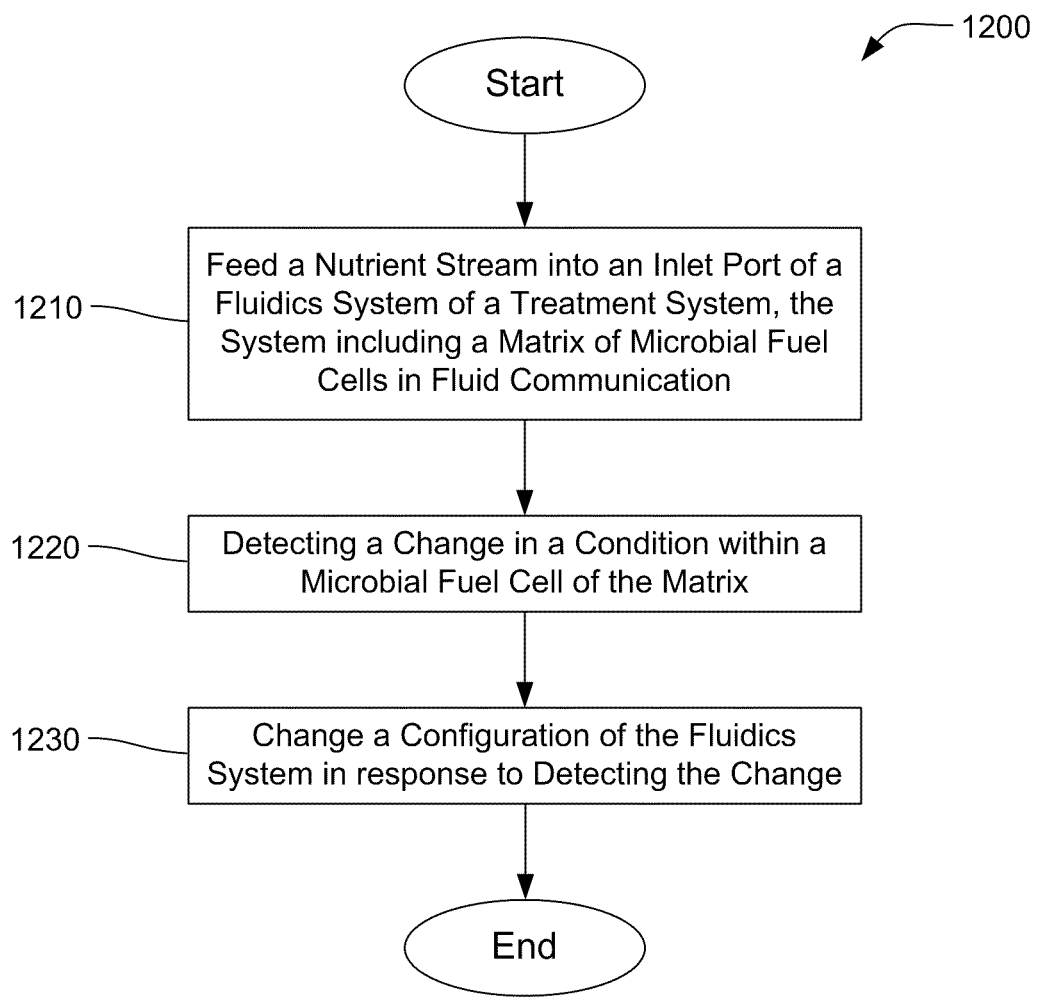
FIG. 12 is a flow-chart representation of a method of controlling a treatment system according to an embodiment of the present invention.

FIG. 12 is a flow-chart representation of an exemplary method 1200 of controlling a treatment system including a matrix of microbial fuel cells in fluid communication through a fluidic system. The method 1200 comprises a step 1210 of feeding a nutrient stream into an inlet port of the fluidics system, a step 1220 of detecting a change in a condition within a microbial fuel cell of the matrix while feeding the nutrient stream into the inlet port, and a step 1230 of changing a configuration of the fluidics system in response to detecting the change.

The step 1210 comprises feeding the nutrient stream into an inlet port of the fluidics system. The nutrient stream will feed microbe populations in the MFCs of the matrix. The microbe populations in the various MFCs may be the same or different from one another. At least some of the microbe populations can comprise, in some embodiments, exoelectrogenic microbes. In various embodiments, one or more microbe populations can comprise non-exoelectrogenic microbes, and in these embodiments, the method 1200 may further comprise an optional step of adding a mediator to those MFCs that include non-exoelectrogenic microbes. The mediator may be added before feeding the nutrient stream into the inlet port, while feeding the nutrient stream into the inlet port, or both.

Step 1220 comprises detecting a change in a condition within a microbial fuel cell of the matrix while feeding the nutrient stream into the inlet port and is essentially the same step as step 1120 of method 1100. Step 1230 comprises changing a configuration of the fluidics system in response to detecting the change. Changing a configuration can include, for example, isolating one of the microbial fuel cells of the matrix. Changing the configuration can also include reversing a direction of flow through one of the microbial fuel cells of the matrix. As another example, changing the configuration can include changing an order of flow through two of the microbial fuel cells of the matrix.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
feeding a nutrient stream to a microbe population in a first chamber of a microbial fuel cell,
the first chamber including
a first electrode connected by a first external electrical circuit to a counter-electrode in a second chamber of the microbial fuel cell and
a second electrode connected by a second external electrical circuit to the counter-electrode, and
the nutrient stream encountering the first electrode before the second electrode as the nutrient stream flows through the first chamber; and
inhibiting further microbial growth in a sub-population of the microbial population associated with the first electrode while promoting growth of a second sub-population of the microbial population associated with the second electrode by raising a resistance of the first external electrical circuit while maintaining the second external electrical circuit.

2. The method of claim 1 wherein raising the resistance of the first external electrical circuit comprises breaking the first external electrical circuit.

3. The method of claim 1 wherein the sub-populations are different.

4. The method of claim 1 wherein the nutrient stream comprises waste water.

5. The method of claim 1 wherein the microbe population includes exoelectrogenic microbes.

6. The method of claim 1 wherein the microbe population does not include exoelectrogenic microbes and the first chamber includes a mediator.

7. The method of claim 1 further comprising monitoring a condition within the first chamber.

8. The method of claim 7 wherein the condition comprises a voltage between the first electrode and the counter-electrode.

9. The method of claim 1 wherein raising the resistance of the first external electrical circuit comprises increasing a load on the first external electrical circuit.

10. The method of claim 3 wherein the first and second sub-populations comprise the same microbes in different metabolic states.

11. The method of claim 1 wherein a semi-permeable membrane separates the first and second chambers of the microbial fuel cell.

* * * * *